(12) United States Patent
Ippatapu et al.

(10) Patent No.: US 11,438,243 B2
(45) Date of Patent: Sep. 6, 2022

(54) ADAPTIVE ADJUSTMENT OF LINKS PER CHANNEL BASED ON NETWORK METRICS

(71) Applicant: EMC IP Holding Company LLC, Hopkinton, MA (US)

(72) Inventors: Venkata L. R. Ippatapu, Westborough, MA (US); Kenneth Dorman, West Brookfield, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 20 days.

(21) Appl. No.: 16/382,517

(22) Filed: Apr. 12, 2019

(65) Prior Publication Data

US 2020/0328954 A1     Oct. 15, 2020

(51) Int. Cl.
| | |
|---|---|
| *H04L 12/825* | (2013.01) |
| *G06F 15/173* | (2006.01) |
| *H04W 24/02* | (2009.01) |
| *H04L 29/08* | (2006.01) |
| *H04L 12/721* | (2013.01) |
| *H04J 1/16* | (2006.01) |
| *H04L 43/06* | (2022.01) |
| *H04L 69/163* | (2022.01) |
| *H04L 43/50* | (2022.01) |
| *G06N 3/08* | (2006.01) |

(52) U.S. Cl.
CPC .............. *H04L 43/06* (2013.01); *G06N 3/08* (2013.01); *H04L 43/50* (2013.01); *H04L 69/163* (2013.01)

(58) Field of Classification Search
CPC ....... H04L 43/06; H04L 43/50; H04L 69/163; G06N 3/08

USPC .......................................................... 709/224
See application file for complete search history.

(56) References Cited

U.S. PATENT DOCUMENTS

| | | | | |
|---|---|---|---|---|
| 6,252,851 | B1* | 6/2001 | Siu ........................ | H04L 47/193 370/428 |
| 6,928,054 | B1* | 8/2005 | Montuno ............... | H04L 69/163 370/235 |
| 7,376,087 | B2* | 5/2008 | Srikrishna ............... | H04L 43/00 709/239 |
| 7,656,800 | B2* | 2/2010 | Morandin ............... | H04L 47/10 370/231 |

(Continued)

*Primary Examiner* — Kevin T Bates
*Assistant Examiner* — Golam Mahmud
(74) *Attorney, Agent, or Firm* — Amin, Turocy & Watson, LLP

(57) ABSTRACT

The described technology is generally directed towards adjusting communication channels. According to an embodiment, a system can comprise a memory that can store computer executable components, and a processor that can execute the computer executable components stored in the memory. The computer executable components can comprise a network metric monitor to monitor a network metric of a communication channel between a first device and a second device, a change in performance of the communication channel based on the network metric. The computer executable components further comprise a channel rating component to adjust a rating of the network connection based on the change in performance of the network connection, resulting in an adjusted rating. The computer executable components further comprise a link controller to adjust the communication channel based on the rating, resulting in an adjusted communication channel.

20 Claims, 10 Drawing Sheets

(56) References Cited

U.S. PATENT DOCUMENTS

| | | | |
|---|---|---|---|
| 8,937,870 B1* | 1/2015 | Callaghan | H04L 69/324 |
| | | | 370/243 |
| 9,313,098 B1* | 4/2016 | Lazarescu | H04L 41/0806 |
| 9,774,539 B1* | 9/2017 | Jia | H04N 45/70 |
| 10,133,980 B2* | 11/2018 | Turner | G06N 7/005 |
| 10,630,561 B1* | 4/2020 | Tao | H04L 43/08 |
| 2002/0176361 A1* | 11/2002 | Wu | H04L 41/147 |
| | | | 370/231 |
| 2005/0165948 A1* | 7/2005 | Hatime | H04L 47/25 |
| | | | 709/234 |
| 2006/0039287 A1* | 2/2006 | Hasegawa | H04L 69/16 |
| | | | 370/252 |
| 2006/0104313 A1* | 5/2006 | Haner | H04W 80/06 |
| | | | 370/328 |
| 2006/0133281 A1* | 6/2006 | Witherell | H04L 69/163 |
| | | | 370/238 |
| 2006/0291435 A1* | 12/2006 | Hirsimaki | H04L 47/27 |
| | | | 370/338 |
| 2008/0037420 A1* | 2/2008 | Tang | H04L 47/10 |
| | | | 370/231 |
| 2008/0130726 A1* | 6/2008 | Sofer | H04W 28/22 |
| | | | 375/220 |
| 2010/0248643 A1* | 9/2010 | Aaron | H04L 1/0022 |
| | | | 709/233 |
| 2011/0096678 A1* | 4/2011 | Ketonen | H04L 43/00 |
| | | | 370/252 |
| 2014/0241159 A1* | 8/2014 | Kakadia | H04L 43/08 |
| | | | 370/235 |
| 2014/0286258 A1* | 9/2014 | Chowdhury | H04L 47/40 |
| | | | 370/329 |
| 2016/0261503 A1* | 9/2016 | Burgess | H04L 69/14 |
| 2017/0078141 A1* | 3/2017 | Lazarescu | H04L 43/08 |
| 2017/0207997 A1* | 7/2017 | Martin | H04L 43/0894 |
| 2018/0206136 A1* | 7/2018 | Chow | H04L 43/0876 |
| 2018/0267539 A1* | 9/2018 | Shih | G05D 1/0295 |
| 2020/0007427 A1* | 1/2020 | Kumar T V | H04L 67/142 |
| 2020/0196166 A1* | 6/2020 | Ananth | G06N 3/006 |

* cited by examiner

500 ⟶

| RTT VALUE 520 | RATING 530 | EXAMPLE PERFORMANCE DROP 540 |
|---|---|---|
| 0 | 1 | |
| 1 - 5 | 2 | THROUGHPUT DROPS BY 20% |
| 6 - 10 | 3 | THROUGHPUT DROPS BY 30% |
| 11 - 15 | 4 | THROUGHPUT DROPS BY 40% |
| 16 - 20 | 5 | THROUGHPUT DROPS BY 50% |
| > 20 | 8 | THROUGHPUT DROPS BY 80% |

802 — MONITOR A NETWORK METRIC OF A COMMUNICATION CHANNEL OF A NETWORK BETWEEN A FIRST DEVICE AND A SECOND DEVICE, WHEREIN A CHANGE IN PERFORMANCE OF THE COMMUNICATION CHANNEL IS DETERMINED BASED ON THE NETWORK METRIC

NETWORK METRIC MONITOR 170

804 — ADJUST A RATING OF THE COMMUNICATION CHANNEL BASED ON THE CHANGE IN PERFORMANCE OF THE COMMUNICATION CHANNEL, RESULTING IN AN ADJUSTED RATING

CHANNEL RATING COMPONENT 130

804 — ADJUST THE COMMUNICATION CHANNEL BASED ON THE ADJUSTED RATING, RESULTING IN AN ADJUSTED COMMUNICATION CHANNEL

LINK CONTROLLER 190

*FIG. 8*

ADAPTIVE ADJUSTMENT OF LINKS PER CHANNEL BASED ON NETWORK METRICS

TECHNICAL FIELD

The subject application generally relates to computer networks, and, for example, to tuning network connections between computers, and related embodiments.

BACKGROUND

In computer systems with remote components, the quality of network connections can be an important factor in the effective operation of applications. Especially when using networks spanning long distances, network problems such as high round trip time (RTT), packet drops, packet timeouts, and re-transmits, can introduce latency into application communications. This latency can cause data buffers to fill and processing resources to be diverted to handle backlogged buffers.

One approach to handling communications between systems uses communications channels with communication links to handle data, e.g., transmission control protocol/internet protocol (TCP/IP) links. Problems can occur however, because systems do not change the number of links used based on network conditions.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components and a processor that can execute the computer executable components stored in the memory. The computer executable components can comprise a network metric monitor that can monitor a network metric of a communication channel between a first device and a second device, wherein a change in performance of the communication channel can be determined based on the network metric. The computer executable components can further comprise a channel rating component that can adjust a rating of the network connection based on the change in performance of the network connection. The computer executable components can further comprise a link controller to adjust the communication channel based on the rating, resulting in an adjusted communication channel.

According to another embodiment, a computer-implemented method can comprise communicating, by a system comprising a processor, with a computer, by employing a communication channel of a network. The method can further comprise receiving, from a link controller, by the system, an instruction that can modify the communication channel, wherein the link controller can generate the instruction based on an indication from a network metric monitor that a network metric of the communication channel has changed.

According to another embodiment, a computer program product is provided. The computer program product can comprise machine-readable storage medium comprising executable instructions that, when executed by a processor, can facilitate performance of operations comprising monitoring a network metric of a communication channel between a first device and a second device, wherein a change in performance of the communication channel is determined based on the network metric. The operations can further comprise modifying a rating of the communication channel based on the change in performance of the communication channel, resulting in a modified rating, and modifying the communication channel based on the modified rating, resulting in an adjusted communication channel.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which:

FIG. 5 depicts an example approach to rating network metrics by a channel rating component, according to one or more embodiments.

FIG. 8 is a flow diagram representing example operations of a system comprising a network metric monitor, a channel rating component, and a link controller, that can facilitate the adaptive adjustment of links per channel based on network metrics.

DETAILED DESCRIPTION

Various aspects described herein are generally directed towards facilitating the adaptive adjustment of links per channel based on network metrics. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/ implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein employ hardware and/or software to solve problems that are highly technical in nature (e.g., using artificial intelligence or machine learning to adaptively tune network connections), that are not abstract and cannot be performed as a set of mental acts by a human. For example, a human, or even a plurality of humans, cannot efficiently, accurately and effectively, manually analyze and prioritize the voluminous amounts data associated with network metrics and communication channels, with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
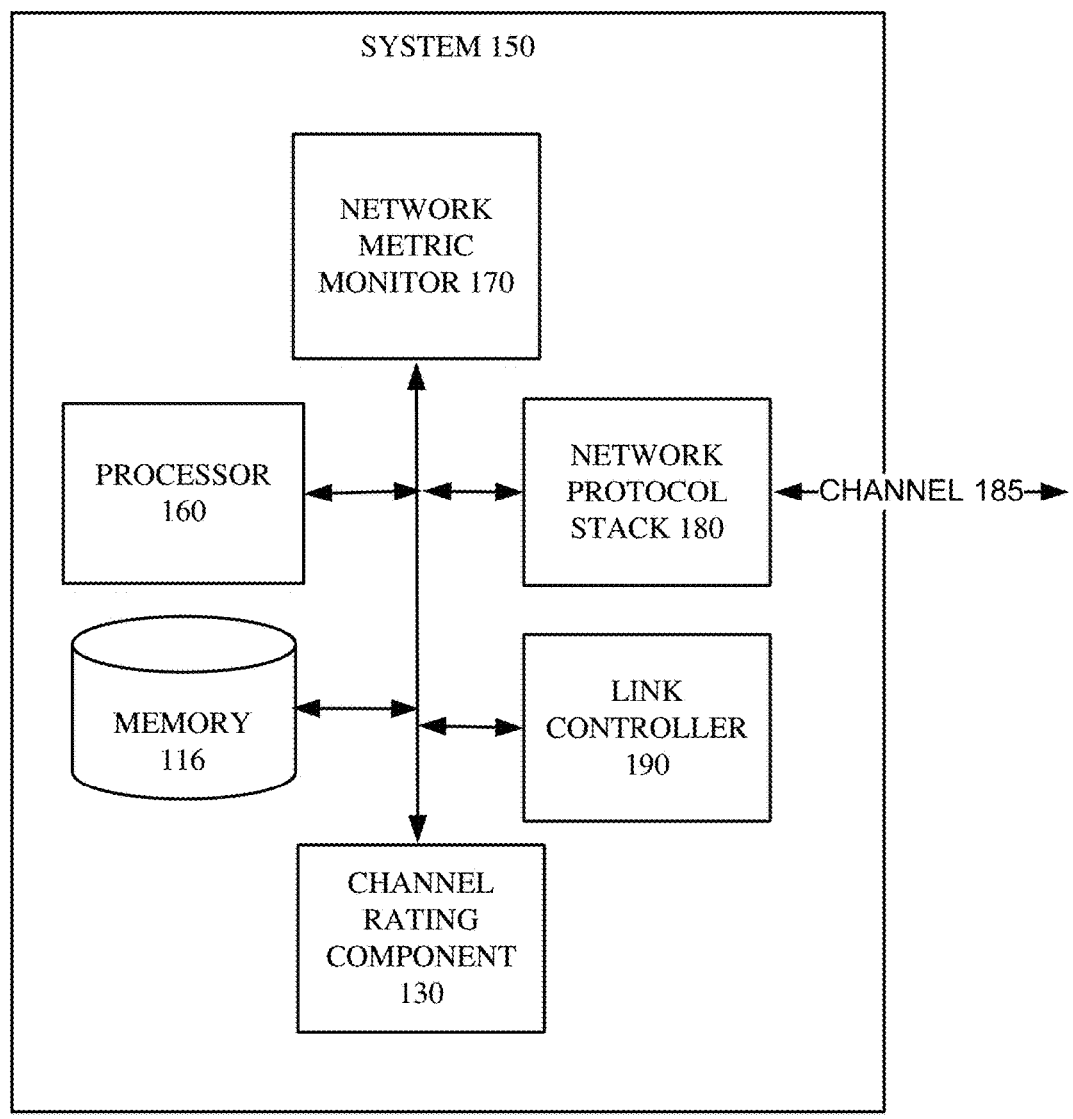
FIG. 1 illustrates a block diagram of an example, non-limiting system that can facilitate the adaptive adjustment of links per channel based on network metrics, in accordance with various aspects and implementations of the subject disclosure.

FIG. 1 illustrates a block diagram 100 of an example, non-limiting system 150 that can facilitate adaptive adjustment of links per channel based on network metrics, in accordance with various aspects and implementations of the subject disclosure.

In one or more embodiments, system can comprise memory 116 that stores computer executable components and processor 160 that can execute the computer executable components stored in the memory. The computer executable components can comprise a network metric monitor 170 that can monitor a network metric of a communication channel 185 (e.g., by employing network protocol stack 180) between a first device and a second device, wherein a change in performance of the communication channel can be determined based on the network metric. The computer executable components can further comprise a channel rating component 130 that can adjust a rating of the network connection based on the change in performance of the network connection. The computer executable components can further comprise a link controller to adjust the communication channel based on the rating.

As discussed further below with FIG. 10, in some embodiments, memory 116 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 116 are described below with reference to system memory 1016 and FIG. 10. Such examples of memory 116 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 116. For example, processor 160 can perform various operations that can be specified by such computer and/or machine readable, writable, and/or executable components and/or instructions including, but not limited to, logic, control, input/output (I/O), arithmetic, and/or the like.

In one or more embodiments, processor 160 can execute computer executable components including network metric monitor 170, link controller 190, channel rating component 130, and network protocol stack 180.

Figure 2:
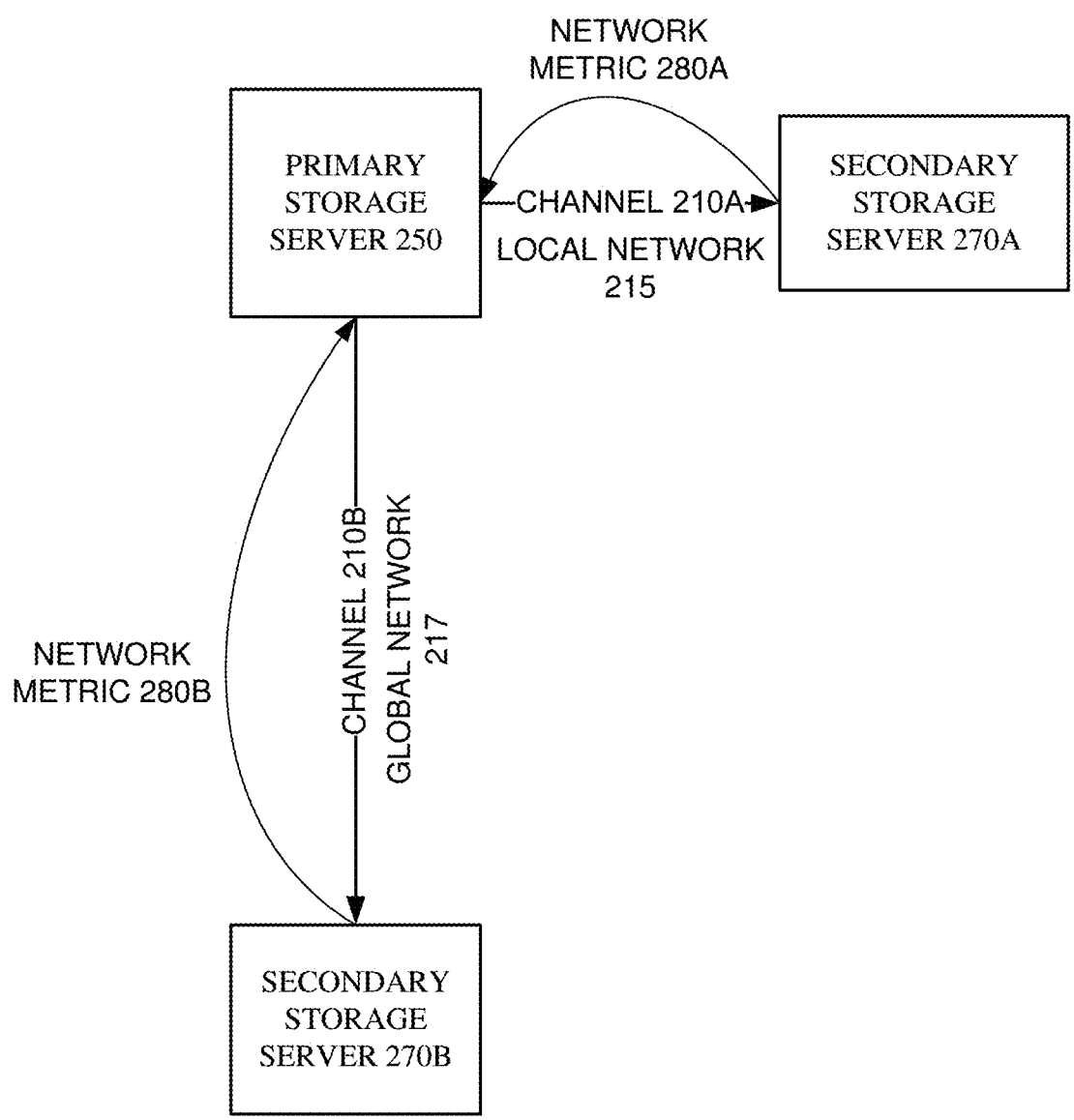
FIG. 2 illustrates a sample data protection system that can use different embodiments described herein.

FIG. 2 illustrates a sample data protection system 200 that can use different embodiments described herein. For purposes of brevity, description of like elements and/or processes employed in other embodiments is omitted.

In this example, one or more embodiments can, in some circumstances, improve the performance of data protection systems by intelligently controlling and managing links across system components. Example data protection systems can include, but are not limited to, data replication systems, redundant drive array systems, and systems providing data backup and restoration capabilities, e.g., VMAX ALL FLASH STORAGE®, provided by DELL EMC. It should be noted that this example is non-limiting, and one or more embodiments described herein can be used with different systems having different functions, but similar components.

System 200 includes a primary storage server 250 coupled by channel 210A on local network 215 to secondary storage server 270A, and also coupled by channel 210B on global network 217 to secondary storage server 270B. In one or more embodiments, as a part of a data protection system, system 200 can copy data from primary storage server 250 to secondary storage servers 270A-B. In some implementations one or both of secondary storage servers 270A-B are remote storage servers, in a geographical location from primary storage server 250. This separation can facilitate, in some circumstances, disaster recovery and fault tolerance for the data of primary storage server 250.

In some implementations, one or both of secondary storage servers 270A-B can be local to primary storage server 250. In an example discussed below, secondary storage server 270A is local to primary storage server 250, e.g., both being on a local network, and secondary storage server 270B is remote to primary storage server 250, e.g., by employing global network 217. It should be appreciated that global network 217 is described as such to emphasize its long-distance connection, and other network scopes can be utilized with one or more embodiments, e.g., regional networks, neighborhood networks, and building networks. In some circumstances, channels that provide local network connectivity (e.g., local network 215) can have significantly different characteristics, e.g., global network 217 can have characteristics that can degrade the performance of the data transfer between primary storage server 250 and secondary storage server 270B.

One or more embodiments can dynamically compensate for differences in network characteristics that can degrade the performance of system 200. As depicted in FIG. 2, each of secondary storage servers 270A-B can have associated network metrics 280A-B. Example network metrics 280A-B monitored by one or more embodiments can include, but are not limited to, RTT latency, packet drops, packet timeouts, and re-transmits. Examples of network metrics effects on network performance (e.g., RTT) are discussed further with FIG. 4 below.

In some circumstances, one or more embodiments can improve the operation of data protection system 200 by reducing data link loss risks, reducing overall replication latency, ensuring high data availability across protection system components, and increasing network link throughput.

Figure 3:
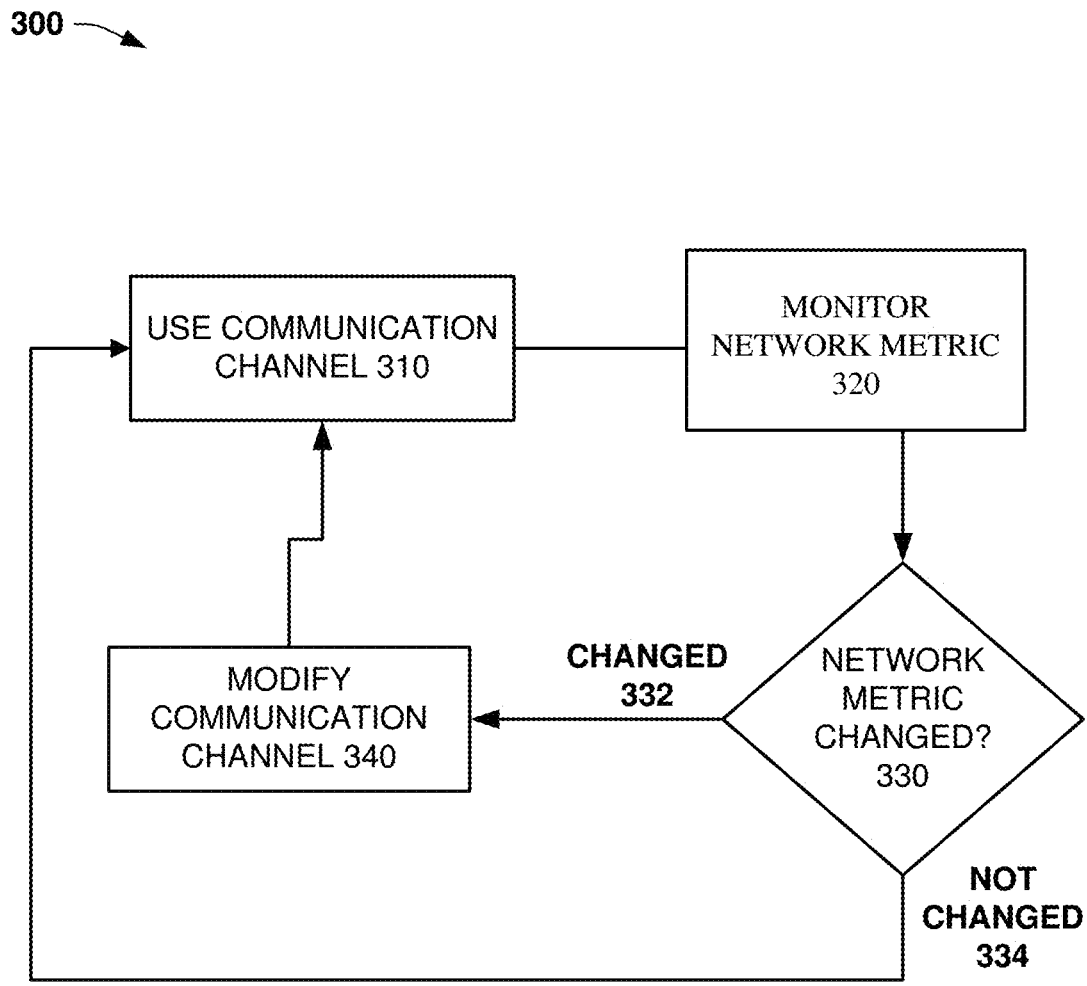
FIG. 3 depicts an example flow diagram illustrating one or more embodiments that can facilitate adaptive adjustment of links per channel based on network metrics.

FIG. 3 depicts an example flow diagram 300 illustrating one or more embodiments that can facilitate adaptive adjustment of links per channel based on network metrics. For purposes of brevity, description of like elements and/or processes employed in other embodiments is omitted.

In one or more embodiments, when using communication channel 310, network metric monitor 170 can monitor network metrics 320. In one or more embodiments, network metric monitor 170 can monitor network metrics for different protocols, e.g., TCP/IP, and these metrics can include, but are not limited to: RTT, TCP/IP packet loss and re-transmissions (retransmits), and congestion window size.

When one or more embodiments of network metric monitor 170 determine that one or more network metrics 280A-B have changed 330 channel rating component 130 can determine a rating for the change. Example approaches to determining the rating can be based on the change to the network metric. Example approaches to determining a rating for a changed network metric (e.g., RTT) are discussed with FIG. 5 below.

Based on the determined rating, link controller 190 can modify the network channel 340 to adapt to the changed network metric 280A-B. In one or more embodiments, the number of links in the communication channel can be changed to adapt to the change in network metrics, e.g., a number of TCP/IP communication links can be changed to adapt to the changes network metrics.

In one or more embodiments, based on the determined rating, link controller 190 can determine a number of links required to maintain the required network performance for a task, e.g., performing data protection while maintaining low link losses and performance drops. In one or more embodiments, link controller 190 can use the rating computed by channel rating component 130 as an input and compute a number of TCP/IP links to counter the change. In additional embodiments, link controller can also ensure that the selected number of links are active and being utilized to run traffic.

In one or more embodiments, the number of links selected for a channel can correspond to the rating determined for the channel by channel rating component 130. Thus, when determining a change in the amount of links to implement based on a rating, one approach can subtract the current number of TCP/IP links from the determined rating. In one or more embodiments, link controller 190 can also implement a change in TCP/IP links for a communication channel and thus, in some circumstances, also increase the data parallelism in the use of the channel as well as increase the throughput across the network.

In one or more embodiments, when a reduction in the number of TCP/IP links is selected, link controller 190 can close any extra number of connections that are not required. In some circumstances, this closing of connections can further increase performance by reducing unnecessary CPU cycles used for processing unneeded connections. In addition, by closing links, input and output traffic can also be equally load balanced across all the replication links, thereby reducing contention on any single link performing data replication.

In alternate or additional embodiments, link controller 190 can further adaptively adjust the number of TCP/IP connections based on a measure of system input traffic, and available bandwidth.

Figure 4:
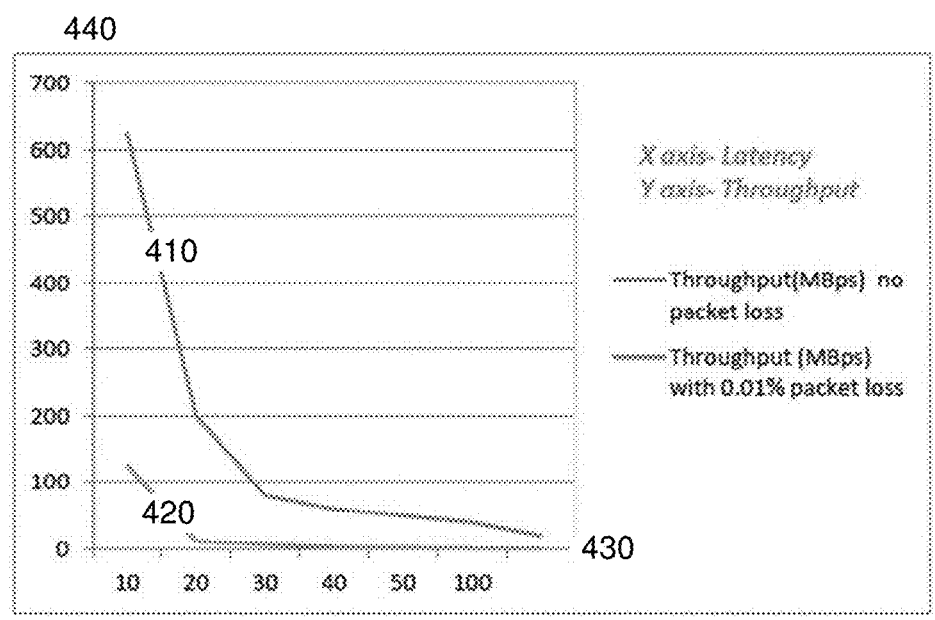
FIG. 4 illustrates an example chart of a relationship between an example network metric (e.g., latency) and throughput of a communication channel.

FIG. 4 illustrates an example chart of a relationship between an example network metric (e.g., latency) and throughput of a communication channel. For purposes of brevity, description of like elements and/or processes employed in other embodiments is omitted.

In one or more embodiments, different network metrics 280A-B can be monitored by network metric monitor 170 at different time intervals or in response to different events, to determine whether one or more network metrics 280A-B have changed 330. For example, in one or more embodiments, packet loss and retransmit metrics can be monitored for every time interval T and compared with the computed values for previous time internal T−1. In some circumstances, an increase in either or both of these metrics over an interval can indicate the channel link has become more lossy.

Turning to different network metrics and network communication problems addressed by one or more embodiments, RTT is a network metric indicating the time required for a signal pulse or packet to travel from a specific source to a specific destination and back again. The RTT is one measure of latency (e.g., network delay) present of a network. A number of retransmits can indicate that a lossy network requires packet retransmissions to continue traffic. Congestion window size is a network metric that can refer to outstanding outbound data, e.g., if the outstanding data is greater than the send threshold, network can be congested, otherwise, bandwidth can be available to send data without being congested.

FIG. 5 depicts an example approach to rating network metrics according to one or more embodiments. For purposes of brevity, description of like elements and/or processes employed in other embodiments is omitted.

In this example, an RTT value 520 is displayed, along with a rating 530 that can be assigned to a communication channel having this RTT value, e.g., by channel rating component 130. For each example rating, an example performance drop 540 is listed, to illustrate the performance associated with different RTT values and ratings.

Figure 6:
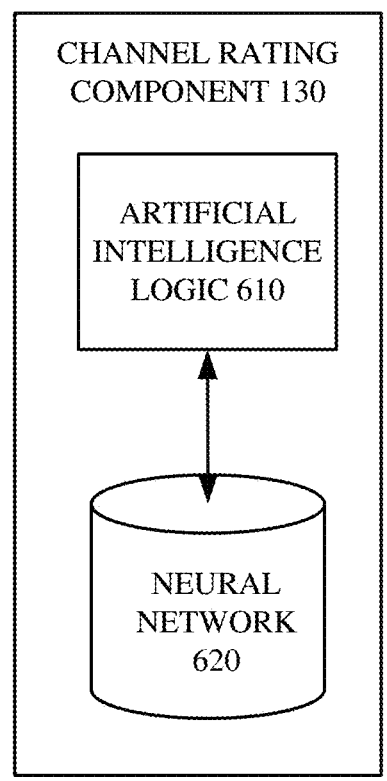
FIG. 6 illustrates a more detailed view of one or more embodiments of a channel rating component.

FIG. 6 illustrates a more detailed view of one or more embodiments of channel rating component 130. For purposes of brevity, description of like elements and/or processes employed in other embodiments is omitted.

In this example, channel rating component 130 comprises artificial intelligence logic 610. In one or more embodiments, artificial intelligence logic 610 can be employed with at least one or more of the computer-executable components described above (e.g., channel rating component 130) to improve system throughput (e.g., replication throughput of data protection system 200), and mitigate data link loss.

In this regard, artificial intelligence logic 610 can perform classifications, correlations, inferences and/or expressions associated with principles of artificial intelligence. In one example, artificial intelligence logic 610 can employ a probabilistic and/or statistical-based analysis (e.g., factoring into the analysis throughput and costs) to learn and/or generate inferences. Artificial intelligence logic 610 can also employ any suitable machine-learning based techniques, statistical-based techniques and/or probabilistic-based techniques. For example, artificial intelligence logic 610 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based and deep context-based analytical systems, systems employing Bayesian models, etc. In another aspect, artificial intelligence logic 610 can perform a set of machine learning computations. For example, artificial intelligence logic 610 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

One way that artificial intelligence logic 610 can facilitate the adaptive tuning of links per channel based on network metrics is by using neural network 620. One or more embodiments can employ one or more neural networks 620 optimized by data including, but not limited to, previously determined performance of the network and analysis of previous activity of communication channels.

Figure 7:
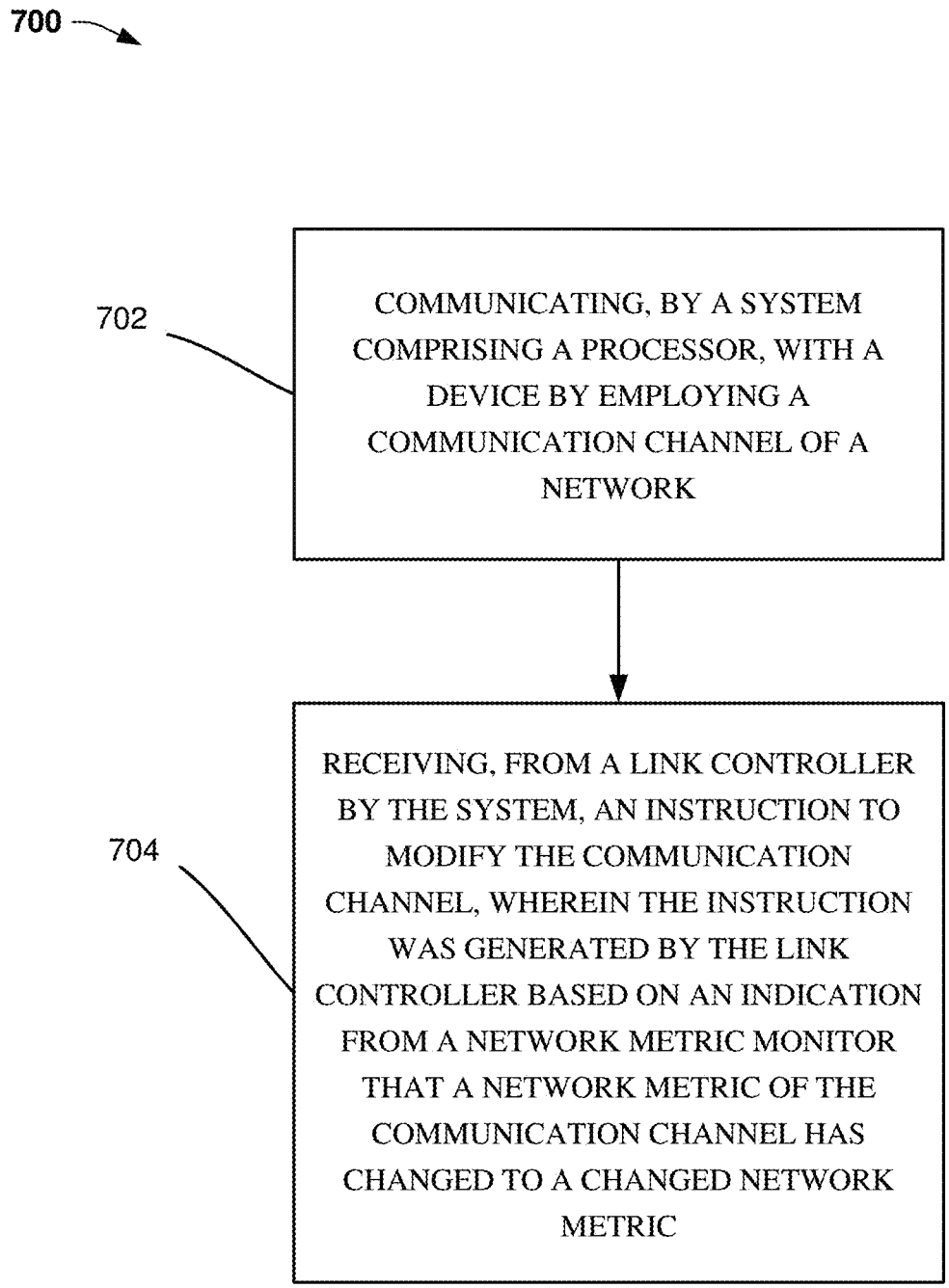
FIG. 7 illustrates an example flow diagram for a method that can facilitate the adaptive adjustment of links per channel based on network metrics, in accordance with one or more embodiments.

FIG. 7 illustrates an example flow diagram for a method 700 that can facilitate the adaptive adjustment (e.g., by link controller 190) of links per channel (e.g., channel 210B) based on network metrics 280B, in accordance with one or more embodiments. For purposes of brevity, description of like elements and/or processes employed in other embodiments is omitted.

At element 702, method 700 can comprise communicating, by a system (e.g., primary storage server 250 of data protection system 200) comprising a processor 160, with a device (e.g., secondary storage server 270B) by employing a communication channel 210B of a network (e.g., global network 217).

At element 704, method 700 can comprise receiving, from a link controller 190 by the system (e.g., by network protocol stack 180), an instruction to adjust the communication channel 210B, wherein the instruction was generated by the link controller 170 based on an indication from a network metric monitor 170 that a network metric 280B of the communication channel 210B has changed.

FIG. 8 is a flow diagram 800 representing example operations of a system 800 comprising network metric monitor 170, channel rating component 130, and link controller 190, that can facilitate the adaptive adjustment of links per channel based on network metrics. For purposes of brevity, description of like elements and/or processes employed in other embodiments is omitted.

Network metric monitor 170 can be configured 802 to monitor a network metric of a communication channel of a network between a first device and a second device, wherein a change in performance of the communication channel is determined based on the network metric, in accordance with one or more embodiments.

Channel rating component 130 can be configured 804 to adjust a rating of the communication channel based on the change in performance of the communication channel, in accordance with one or more embodiments. Link controller 190 can be configured 806 to adjust the communication channel based on the rating.

Figure 9:
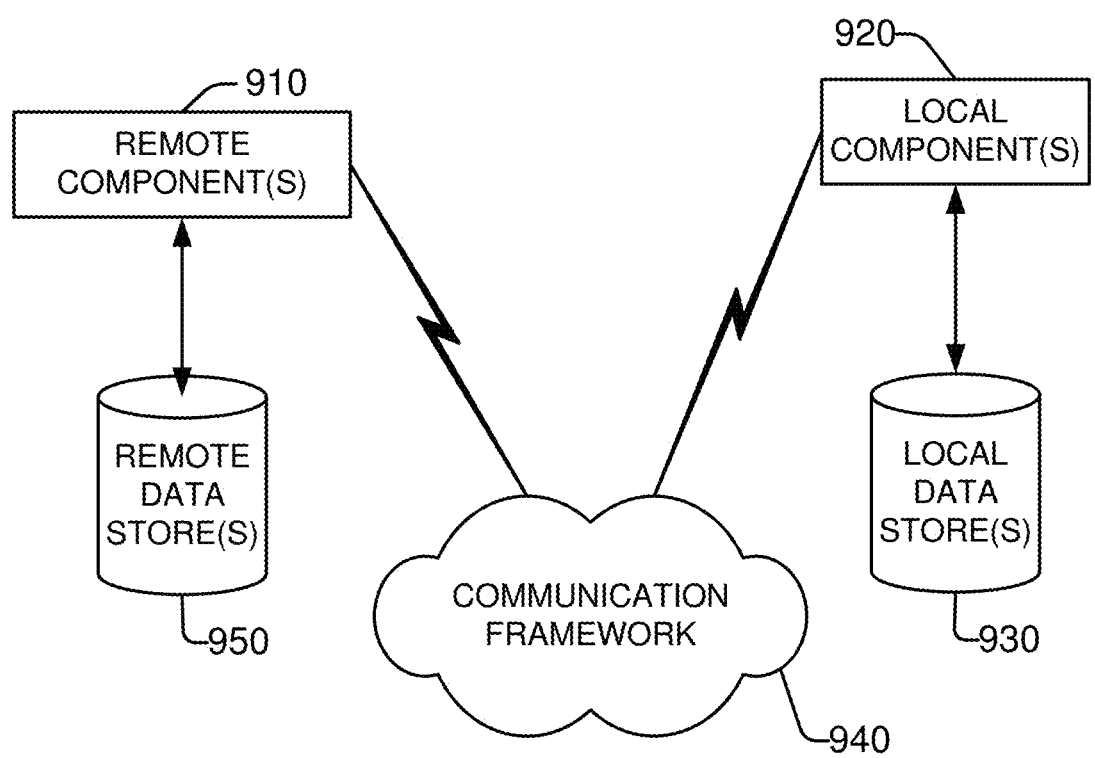
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise network metric monitor 170, link controller 190, and channel rating component 130).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
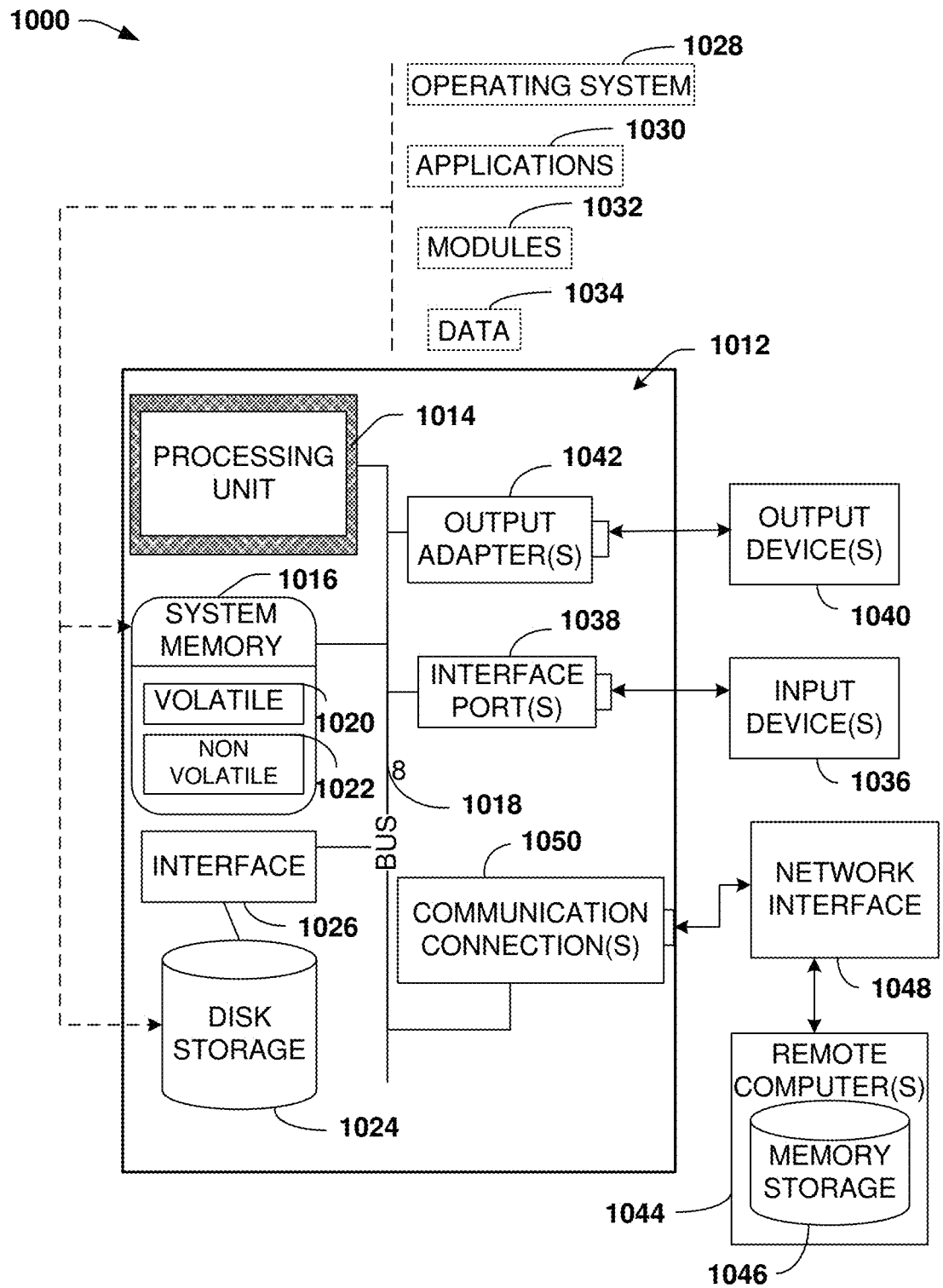
FIG. 10 illustrates an example block diagram of a computing system operable to execute the disclosed systems and methods in accordance with various aspects and implementations of the subject disclosure.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A data protection system, comprising:
   a memory that stores computer executable components; and
   a processor that executes the computer executable components stored in the memory, wherein the computer executable components comprise:
      a network metric monitor to monitor a network metric of a communication channel of a network for a first device to replicate data to a second device, wherein a change in performance of the communication channel is determined based on the network metric, wherein the network metric comprises a measure of congestion window size associated with the first device replicating the data to the second device, and wherein the measure of the congestion window size is based on a comparison of outstanding outbound replication data to a threshold comprising a replication rate during a time period;
      a channel rating component to adjust a rating of the communication channel based on the change in performance of the communication channel and the measure of congestion window size, resulting in an adjusted rating; and
      a link controller to adjust the communication channel based on the adjusted rating, resulting in an adjusted communication channel, wherein adjustment of the communication channel by the link controller comprises the adjustment of a number of replication links comprised in the communication channel to alter the congestion window size, and wherein, based on the adjustment of the number of replication links, to reduce link contention during replication of the data, the link controller load balances input and output traffic across the replication links.

2. The data protection system of claim 1, further comprising a network protocol stack to transmit data via the adjusted communication channel.

3. The data protection system of claim 1, further comprising one or more neural networks optimized based on a previously determined performance of the network and an analysis of previous activity on the communication channel, wherein the channel rating component adjusts the rating further based on an output from the one or more neural networks.

4. The data protection system of claim 1, wherein the link controller is further to determine the number of links required to maintain a network performance level, resulting in a determined number of links, and wherein adjustment of the number of links comprises the adjustment of the number of links based on the determined.

5. The data protection system of claim 4, wherein the links comprise transmission control protocol links.

6. The data protection system of claim 4, wherein the adjustment of the number of links by the link controller is based on the rating and the number of links.

7. The data protection system of claim 1, wherein the change in performance comprises a change in throughput.

8. The data protection system of claim 1, wherein the network metric further comprises a round trip time latency of the communication channel.

9. A method, comprising:
communicating, by a system comprising a processor, with a device by employing a communication channel of a network to replicate data to another device; and
receiving, from a link controller by the system, an instruction to modify the communication channel, wherein the instruction was generated by the link controller based on an indication from a network metric monitor that a network metric of the communication channel has changed to a changed network metric, wherein the network metric comprises a measure of congestion window size applicable to the device replicating the data to the other device, wherein the modifying the communication channel comprises modifying a number of replication links comprised in the communication channel to change the congestion window size, wherein the measure of the congestion window size is based on a comparison of outstanding data to be replicated to a threshold comprising an amount of data capable of being replicated during a time period, and wherein, based on modifying the number of replication links, to reduce link contention during replication of the data, the link controller load balances input and output traffic across the replication links.

10. The method of claim 9, further comprising, modifying, by the system, the communication channel based on the instruction.

11. The method of claim 10, wherein the modifying the number of links is based on the rating and the number of links.

12. The method of claim 11, wherein the links comprise transmission control protocol links.

13. The method of claim 9, wherein the instruction to modify the communication channel is based on a rating of the communication channel.

14. The method of claim 9, wherein the changed network metric further comprises a round trip time network metric.

15. The method of claim 9, wherein the link controller generated the instruction further based on an output from one or more neural networks trained on previously determined performances of the network and analysis of previous activities of the communication channel.

16. A non-transitory machine-readable medium, comprising executable instructions that, when executed by a processor of a network device, facilitate performance of operations, comprising:

monitoring a network metric of a communication channel used by a first device to replicate data to a second device, wherein a change in performance of the communication channel of a network is determined based on the network metric, wherein the network metric comprises a measure of congestion window size of the first device replicating the data to the second device, and wherein the measure of the congestion window size is based on a comparison of outstanding outbound data to an amount of data capable of being sent during a time period;

modifying a rating of the communication channel based on the change in performance of the communication channel and the measure of congestion window size, resulting in a modified rating; and to increase the congestion window size, modifying the communication channel based on the modified rating, resulting in a modified communication channel, wherein the modifying of the communication channel comprises modifying a number of links comprised in the communication channel, and wherein, based on the modifying the number of links, to reduce link contention during replication of the data, balancing a load of input and output traffic across the links.

17. The non-transitory machine-readable medium of claim 16, wherein the operations further comprise transmitting data using the modified communication channel.

18. The non-transitory machine-readable medium of claim 16, wherein the modifying the rating comprises modifying the rating based on one or more neural networks operating with respect to input to the one or more neural networks, the training input comprising at least one of a previously determined performance of the network or an analysis of a previous activity of the communication channel.

19. The non-transitory machine-readable medium of claim 16, wherein the modifying the number of links is based on the rating and the number of links.

20. The data protection system of claim 1, wherein a replication data processing capacity of the first device comprises the congestion window size.

* * * * *